US012761807B2

(12) United States Patent
Su et al.

(10) Patent No.: US 12,761,807 B2
(45) Date of Patent: Oct. 13, 2026

(54) COMPRESSED MEMORY DUMPS

(71) Applicant: Microsoft Technology Licensing, LLC, Redmond, WA (US)

(72) Inventors: Youquan Su, Redmond, WA (US); David Brookler, Boca Raton, FL (US); Shirley F. Tan, Redmond, FL (US); Neha Bashyam, Redmond, WA (US); Robert Allen Dorr, Lewisville, TX (US); Jay M. Krell, Renton, WA (US); Satyendra K. Mishra, San Jose, CA (US); Eugenio Kuri Sainz, Seattle, WA (US); Swati Agrawal, Redmond, WA (US); Francis Brosseau, Seattle, WA (US); Snigdha Makineni, Redmond, WA (US); Stanislav Oks, Redmond, WA (US); Salvador Orozco Villalever, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 193 days.

(21) Appl. No.: 18/657,448

(22) Filed: May 7, 2024

(65) Prior Publication Data

US 2025/0348227 A1 Nov. 13, 2025

(51) Int. Cl.
*G06F 3/06* (2006.01)

(52) U.S. Cl.
CPC .......... *G06F 3/0617* (2013.01); *G06F 3/0608* (2013.01); *G06F 3/0644* (2013.01); *G06F 3/0665* (2013.01); *G06F 3/0673* (2013.01)

(58) Field of Classification Search
CPC .... G06F 3/0617; G06F 3/0608; G06F 3/0644; G06F 3/0665; G06F 3/0673
See application file for complete search history.

(56) References Cited

U.S. PATENT DOCUMENTS 6,348,881 B1 * 2/2002 Buer .................. H03M 7/3084 375/240
7,079,051 B2 * 7/2006 Storer .................... H03M 7/30 341/51
10,474,588 B1 * 11/2019 Ugale .................. G06F 12/128
10,664,165 B1 * 5/2020 Faibish ................ G06F 3/0638
11,222,066 B1 * 1/2022 Batsakis .............. G06F 3/0652
(Continued)

FOREIGN PATENT DOCUMENTS

CN 104657362 A * 5/2015 ........... G06F 16/901
CN 106354646 A * 1/2017 .......... G06F 11/3692
(Continued)

*Primary Examiner* — Christopher D Birkhimer

(57) ABSTRACT

According to examples, a compressed memory dump apparatus generates one or more compressed dump files from a virtual address space (VAS) of a target process. Memory regions identified from the VAS are grouped into memory buckets so that a memory bucket includes respective memory regions. Parallel threads are spawned to execute parallel dumping operations. The parallel dumping operations include reading the memory regions, compressing the memory buckets to generate compressed chunks, and writing the compressed chunks to the dump files. A compressed memory dump parser module can be used to retrieve the original memory content from the compressed dump files.

20 Claims, 8 Drawing Sheets

(56) References Cited

U.S. PATENT DOCUMENTS

| | | | | |
|---|---|---|---|---|
| 2003/0204698 | A1* | 10/2003 | Sachedina | G06F 12/0806 711/170 |
| 2009/0041230 | A1* | 2/2009 | Williams | G06F 11/1448 707/999.204 |
| 2013/0166861 | A1* | 6/2013 | Takano | G06F 3/064 711/161 |
| 2014/0049413 | A1* | 2/2014 | Agarwal | H03M 7/30 341/87 |
| 2014/0143517 | A1* | 5/2014 | Jin | G06F 12/023 711/171 |
| 2014/0310476 | A1* | 10/2014 | Kruus | G06F 12/0871 711/133 |
| 2018/0089278 | A1* | 3/2018 | Bhattacharjee | H04L 67/1097 |
| 2018/0095674 | A1* | 4/2018 | Alameldeen | G06F 3/064 |
| 2018/0138921 | A1* | 5/2018 | Arelakis | H03M 7/3071 |
| 2018/0246649 | A1* | 8/2018 | Datar | G06F 3/067 |
| 2019/0095493 | A1* | 3/2019 | Bhattacharjee | G06F 7/5324 |
| 2019/0205035 | A1* | 7/2019 | Mizushima | G06F 12/04 |
| 2019/0227734 | A1* | 7/2019 | Iyer | G06F 3/0659 |
| 2020/0019336 | A1* | 1/2020 | Kachare | G06F 3/0653 |
| 2021/0036714 | A1* | 2/2021 | Martin | G06F 13/1668 |

FOREIGN PATENT DOCUMENTS

| | | | | | |
|---|---|---|---|---|---|
| CN | 107247667 | A | * | 10/2017 | G06F 11/3604 |
| CN | 116339925 | A | * | 6/2023 | G06F 9/45558 |

* cited by examiner

400

COMPRESSED MEMORY DUMPS

BACKGROUND

Memory dump files are snapshots of a program's memory taken at a certain point in time, e.g., during a crash. The dump files often include data such as, code lines being executed at the point in time, the values of local variables, stack traces, registers, CPU state, exception information, heap objects, etc. Dump files are used for various purposes, such as, to debug crashed programs or to find memory leaks. There are primarily two types of dump files, a full dump file and a mini dump file. A full dump file includes the whole memory of the program and is often huge in size. A mini dump file is a dump format that can be customized in that it can either contain the entire memory or a portion of the memory. Dump files are often created in different ways. For example, dump files are created by calling Windows® Application Programming Interfaces (API) MiniDumpWriteDump directly in code with different parameters or utilizing different tools such as sqldumper.exe.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1A:
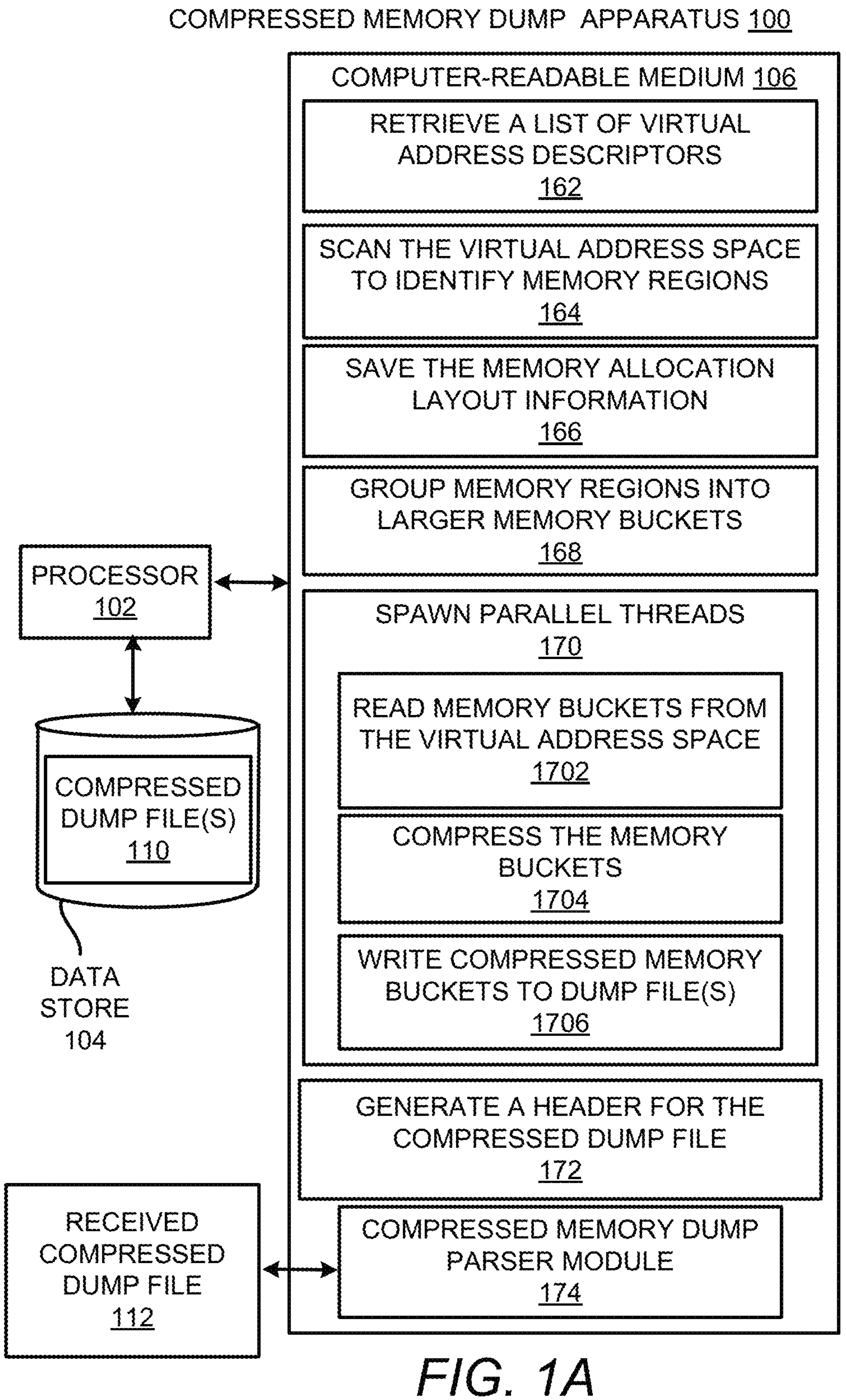
FIG. 1A shows a block diagram of a compressed memory dump apparatus, in accordance with an embodiment of the present disclosure.

For simplicity and illustrative purposes, the principles of the present disclosure are described by referring mainly to embodiments and examples thereof. In the following description, numerous specific details are outlined to provide an understanding of the embodiments and examples. It will be apparent, however, to one of ordinary skill in the art, that the embodiments and examples may be practiced without limitation to these specific details. In some instances, well-known methods and/or structures have not been described in detail so as not to unnecessarily obscure the description of the embodiments and examples. Furthermore, the embodiments and examples may be used together in various combinations.

Throughout the present disclosure, the terms "a" and "an" are intended to denote at least one of a particular element. As used herein, the term "includes" means includes but not limited to, the term "including" means including but not limited to.

Dump files are typically used for various purposes, such as, troubleshooting complex problems like access violations, assertions, or non-yielding problems. In the past, it was cheap to get a dump file when the memory sizes were small. However, with the developments in the field of hardware, some modern machines have several Terabytes (TB) of memory. As a result, generating a dump file for processes which consume large amounts of memory has become challenging because of the huge virtual memory footprint. For example, in certain applications, the time to capture a filtered dump file can be tens of minutes or even longer. When the dump file is being generated, the server processes are suspended resulting in downtime for applications that are backed up by the server. Most enterprise customers cannot accept a downtime of more than 15 seconds for mission-critical applications.

Disclosed herein are compressed memory dump apparatuses that enable the process of dump file creation to be sped up over conventional techniques. As also disclosed herein, the compressed memory dump apparatuses create compressed memory dump files that overcome the size and time issues discussed above for generating the dump files. As compressed dump files are formatted differently than full dump files, also disclosed herein are techniques related to retrieving data from the compressed dump files created by the compressed memory dump apparatus.

The compressed memory dump apparatuses disclosed herein call certain Application Programming Interfaces (APIs) to read the virtual memory of the target process. However, the compressed memory dump apparatuses disclosed herein may not interact with the physical memory directly. Rather, an operating system (OS) may translate virtual addresses to physical addresses. To dump the virtual memory into the dump file, knowledge of the memory allocation layout may be needed. Therefore, the compressed memory dump apparatuses disclosed herein may scan the virtual address space (VAS) of a target process for memory allocation information.

As discussed herein, memory allocation information can include virtual address descriptors (VADs) that describe the ranges of virtual memory address spaces reserved for a specific process and the memory regions are allocated inside the VADs. A memory region may be defined as a range of contiguous memory pages that have the same allocation state (e.g., MEM_COMMIT, MEM_RESERVE, PAGE_READWRITE, etc.). In some examples, the memory regions are be grouped into fixed, equal-sized memory buckets and the memory buckets are compressed to form compressed chunks. The compressed chunks are also written to one or more compressed dump files.

According to examples, when the dump file is being generated, the target process is suspended, during which the CPUs and Input/Output (I/O) activities are paused. For example, if a dedicated database server has 100 CPU cores and the dumping duration is one minute, it means that during the one minute, the 100 cores will be idle, and there is no disk workload except for the dumping activities. The compressed memory dump apparatuses disclosed herein leverage the opportunity to use idle CPU cores and I/O capability to improve the dumping speed. Particularly, the compressed memory dump apparatuses disclosed herein involve leveraging the CPU resources to execute parallel operations of reading the process memory and writing the compressed memory to the dump files.

Further efficiency can be obtained by reducing the dump file size, which is achieved via compressing the memory before writing the memory to the dump files. For instance, different APIs are used to group smaller memory regions into memory buckets which are then compressed and written into the dump files. If a memory region is too large for a memory bucket, the memory region can be split into multiple chunks, which are accommodated in different memory buckets, and which are in turn compressed and written to the dump files.

According to examples disclosed herein, a compressed dump file is formatted to include a header and a compressed memory stream. The header includes at least two memory structures. A first memory structure (e.g., a memory region array) includes metadata regarding the memory regions and a second memory structure (e.g., a memory bucket array) includes metadata of compressed memory buckets. One of the metadata in the second memory structure includes offsets for the various compressed chunks. In addition, the compressed dump file is written to the same disk or to different disks.

As discussed herein, to retrieve the memory from the dump, a parser initially scans the header of a compressed dump file and identifies from the memory region array, a memory region ID corresponding to a given compressed memory chunk. In addition, a memory bucket ID of a memory bucket including a memory region corresponding to the memory region ID is obtained from the memory bucket array. An offset of the compressed memory chunk may also be obtained from the memory bucket. The compressed memory chunk may be retrieved at the offset and decompressed. Moreover, memory contents obtained upon decompressing the compressed memory chunk may be provided to a caller process/program.

A technical improvement associated with the approach of compressing the memory buckets along with the parallel compression and writing processes as described herein may be that the approach not only makes efficient use of resources such as idle CPU cores but also speeds up the dumping processes. These improvements also result in efficient energy and resource utilization. For example, compressing the memory buckets may save almost 80% of the small I/O calls that are normally executed during conventional dump operations where the files are not compressed before being dumped. Since the memory is compressed to a smaller size, the disk write workload can also decrease significantly. Additionally, splitting the memory region(s) into fixed-size memory buckets and then writing the compressed memory buckets to the dump file(s) help achieve high-speed dumping performance and a smaller dump file size. In some cases, the dump file can be as small as 20% of its original filtered dump file, resulting in higher dumping speeds.

Figure 1B:
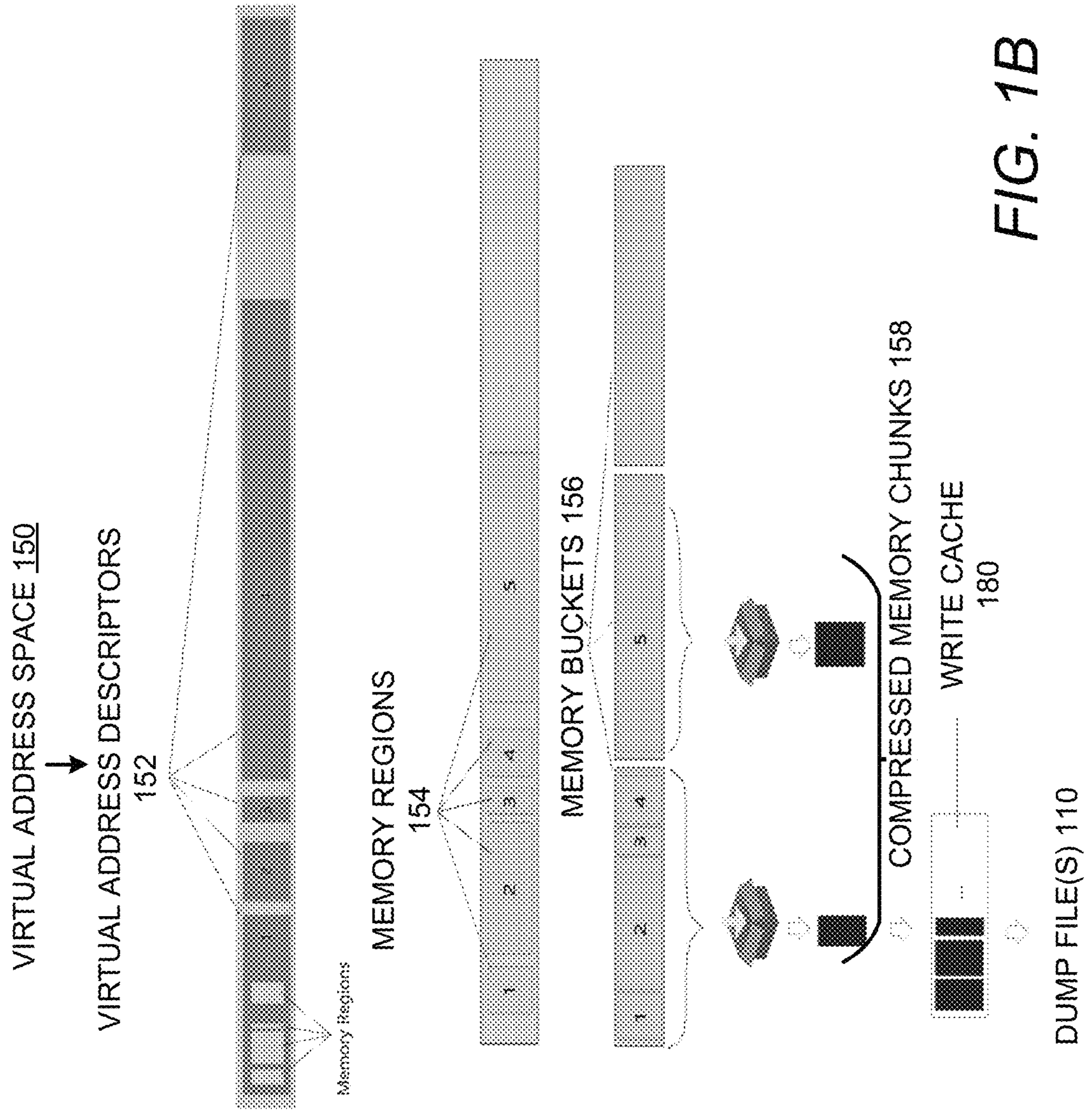
FIG. 1B shows a representational diagram of a virtual address space (VAS) including the various memory components processed by the memory dump apparatus depicted in FIG. 1A, in accordance with an embodiment of the present disclosure.

FIG. 1A shows a block diagram of a compressed memory dump apparatus 100, in accordance with an embodiment of the present disclosure. FIG. 1B shows a representational diagram of a virtual address space (VAS) 150 including the various memory components processed by the memory dump apparatus 100 shown in FIG. 1A, in accordance with an embodiment of the present disclosure. The various features of the memory dump apparatus 100 shown in FIG. 1A will be discussed herein with reference to FIG. 1B.

According to examples, the compressed memory dump apparatus 100 generates one or more compressed dump files 110 of memory regions 154 of the VAS 150 including a set of virtual address descriptors (VADs) 152 of a target process. The compressed dump files 110 generated by the compressed memory dump apparatus 100 are smaller in size than the memory regions 154 and as a result, the dumping process is also faster than a dumping process that generates a dump file which is the same size as the original file.

As shown in FIG. 1A, the compressed memory dump apparatus 100 includes a processor 102, a data store 104, and a computer-readable medium 106. The computer-readable medium 106 has stored thereon machine-readable instructions 162-172 that the processor 102 executes to generate compressed dump files 110. Although the instructions 162-172 are described herein as being stored on the computer-readable medium 106 and thus include a set of machine-readable instructions, the compressed memory dump apparatus 100 may include hardware logic blocks that perform functions similar to the instructions 162-172. For instance, the processor 102 may include hardware components that may execute the instructions 162-172. In other examples, the compressed memory dump apparatus 100 includes a combination of instructions and hardware logic blocks as shown in FIG. 1B to implement or execute functions corresponding to the instructions 162-172. In any of these examples, the processor 102 implements the hardware logic blocks and/or execute the instructions 162-172. As discussed herein, the compressed memory dump apparatus 100 may also include additional instructions and/or hardware logic blocks such that the processor 102 may execute operations in addition to or in place of those discussed above with respect to FIG. 1A.

The processor 102 is a semiconductor-based microprocessor, a central processing unit (CPU), an application-specific integrated circuit (ASIC), a field-programmable gate array (FPGA), and/or the like. The computer-readable medium 106 is, for example, a Random Access memory (RAM), an Electrically Erasable Programmable Read-Only Memory (EEPROM), a storage device, or the like. In some examples, the computer-readable medium 106 is a non-transitory computer-readable storage medium, where the term "non-transitory" does not encompass transitory propagating signals. In any regard, the computer-readable medium 106 has stored thereon machine-readable instructions executable by the processor 102. Similarly, the data store 104 is also a Random Access Memory (RAM), an Electrically Erasable Programmable Read-Only Memory (EEPROM), a storage device, or the like.

Although the compressed memory dump apparatus 100 is depicted as having a single processor, it should be understood that the compressed memory dump apparatus 100 may include additional processors and/or cores without departing from a scope of the compressed memory dump apparatus 100. In this regard, references to a single processor 102, as well as to a single computer-readable medium 106, may be understood to additionally or alternatively pertain to multiple processors 102, and/or multiple computer-readable mediums 106. In addition, or alternatively, the processor 102 and the computer-readable medium 106 may be integrated into a single component, e.g., an integrated circuit on which both the processor 102 and the computer-readable medium 106 may be provided. In addition, or alternatively, the operations described herein as being performed by the processor 102 can be distributed across multiple corresponding apparatuses and/or multiple processors.

When executing a process, a memory manager (not shown) maintains the VADs 152 that describe the ranges of the virtual memory address space reserved for the specific process. For instance, in the Windows® operating system (OS), the QueryVirtualMemoryInformation API enables swift retrieval of the list of VADs. The VADs 152 can vary in size and if the VADs 152 are read in parallel, a sync lock may be used as smaller VADs can be scanned faster than bigger VADs. As shown in FIG. 1B, memory regions 154 are allocated inside the VADs 152 and the memory regions 154 can have different allocation sizes. Even if the memory regions 154 are contiguous, they may yet have different allocation states. According to examples, the processor 102 executes instructions 162 to read the layout of the target process's VAS 150 and retrieve a list of VADs In high-end servers, the VAS 150 may reach several terabytes in size. Detecting the memory regions 154 within such a vast range could be a time-consuming process that may take many minutes to complete. To enhance efficiency, the compressed memory dump apparatus 100 implements multiple threads to concurrently scan the address space. For instance, the processor 102 executes instructions 164 to scan the VAS 150 in parallel to identify the memory regions 154 in the memory allocation layout i.e., the sequential order in which memory addresses are allocated. However, considering that the memory regions 154 may not be evenly distributed, the parallel threads are assigned to examine subsets of the memory regions 154 associated with each of the VADs 152. In some examples, synchronization locks are used because the speed of the memory layout scans differ among the VADs 152—some can be quickly scanned, while others, particularly larger ones, require more time for detection. This approach ensures that certain threads may scan numerous very small VADs 152, while others may focus on scanning just a few substantial VADs 152.

The processor 102 executes instructions 166 to save the memory allocation layout information in a dump file header as memory information. The processor 102 also executes instructions 168 to group the memory regions 154 into larger memory buckets 156. A memory bucket 156 may be defined as a fixed-size group of memory regions and different memory buckets 156 may have fixed sizes equal to each other. Accordingly, the processor 102 executes instructions 168 to select different memory regions 154 to fit the fixed-size requirements of the memory bucket 156. Therefore, if one of the memory regions 154 is too big to fit into a memory bucket 156, the memory region 154 is split into proper chunks accordingly. For instance, if the memory bucket 156 size is configured as 4 MB, memory regions 154 of 1 MB, 1 MB, and 2 MB can be combined into a 4 MB memory bucket 156. However, a 5 MB memory region is divided due to its size into two parts. The initial 4 MB segment forms a new memory bucket, while the remaining 1 MB is copied into a separate memory bucket along with other regions which are selected to fit the remaining 3 MB in the memory bucket.

The processor 102 executes instructions 170 to spawn parallel threads to execute a parallel dump of the memory buckets 156 into one or more dump files. Each of the parallel threads executes sub-processes in parallel and independently for transferring the memory buckets 156 to the compressed dump files 110. For instance, the processor 102 executes instructions 1702 to read the memory buckets 156 from the VAS 150 or process memory via the parallel threads. Another consideration for dumping speed is the number of memory regions 154 to be dumped. If a large number of memory regions 154 are present, the memory stream can become quite large. Therefore, the processor 102 executes instructions 1704 to compress the memory buckets 156 into compressed memory chunks 158. Any of a number of different compression libraries can be used to compress the memory buckets 156. For example, the LZ4 algorithm can be used for faster decompression. The LZ4 algorithm is lossless compression algorithm, providing compression speeds greater than 500 MB/s per core, scalable with a multi-core CPU. The LZ4 algorithm features an extremely fast decoder, with speeds in multiple Gigabytes per second (GB/s) per core, typically reaching RAM speed limits on multi-core systems.

Since compression uses a great deal of CPU resources, compressing the memory buckets 156 in parallel can significantly shorten the dumping duration. The use of several cores can also help speed up the performance by several times.

The processor 102 executes instructions 1706 to write the compressed memory chunks 158 to the compressed dump files 110. The compressed memory chunks 158 can be dumped into a single dump file or memory stream files (if specified). The size of the compressed memory chunks 158 may be relatively small, and it is suboptimal to write each compressed memory chunk to disk individually. To enhance performance, the processor 102 executes instructions 1706 to initially write the compressed memory chunks 158 to a write cache 180 to consolidate small writes and reduce their number, thereby causing a notable increase in the write performance. After completing the parallel tasks, the processor 102 executes instructions 172 to generate a header for the compressed dump file(s) 110. The header is configured with metadata regarding the respective memory regions 154 and the memory buckets 156 that contain the memory regions 154.

The computer-readable medium 106 also includes a compressed memory dump parser module 174 that includes a compressed memory target plugin that serves to authenticate the format of a compressed dump file, verifying its metadata and ensuring data integrity. The compressed dump parser module 174 operates in two validation modes, a normal mode and a full mode. In the full mode, the compressed dump parser module 174 conducts a thorough validation of each memory region 154 and every memory bucket 156, confirming the decompression viability and validating the length of each memory bucket 156. The compressed memory target plugin may be used to decompress a received compressed dump file 112 and enable data retrieval therefrom in accordance with methods disclosed herein.

Figure 2:
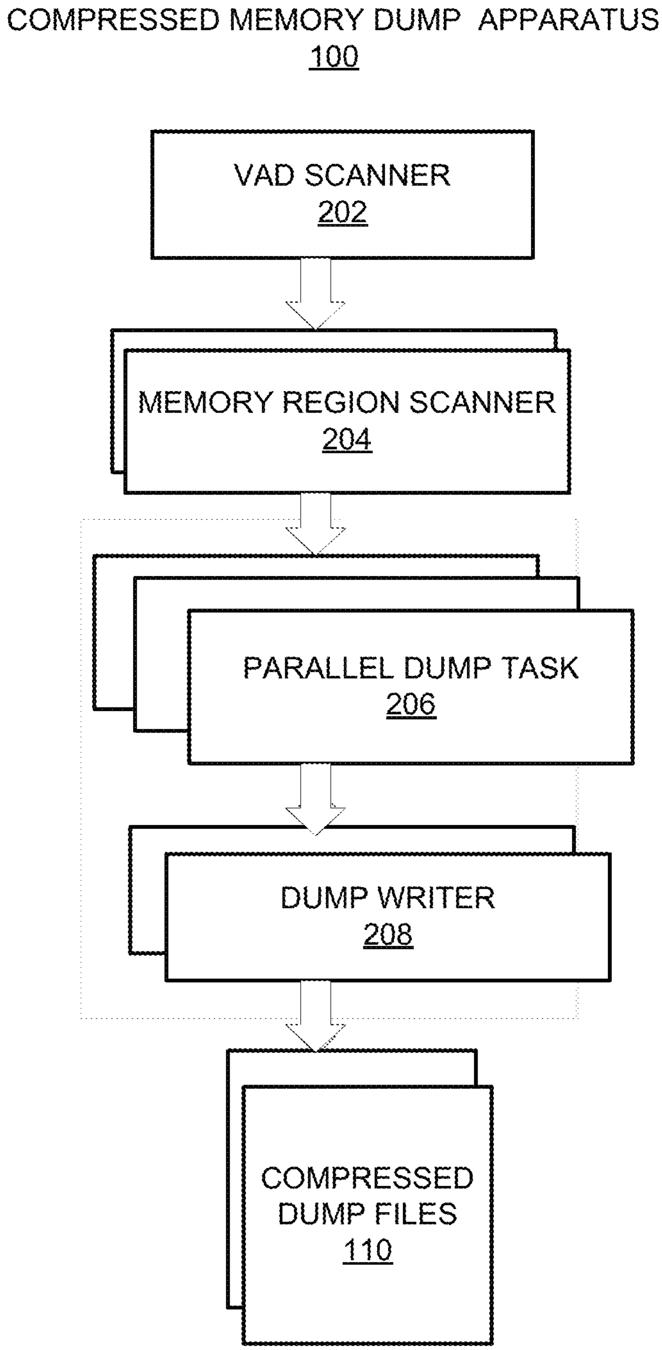
FIG. 2 shows a block diagram of the various processes of the compressed memory dump apparatus depicted in FIG. 1A, in accordance with an embodiment of the present disclosure.

FIG. 2 shows a block diagram of the various processes of the compressed memory dump apparatus 100, in accordance with an embodiment of the present disclosure. The process of generating the compressed dump files 110 includes a VAD scanner 202, a memory region scanner 204, a plurality of parallel dump tasks 206, and multiple dump writers 208. The processor 102 executes the various tasks via execution of the corresponding steps 162-170.

The VAD scanner 202 retrieves a list of the VADs 152. For example, the VAD scanner 202 may be implemented via the execution of instructions 162. Multiple memory region scanner(s) 204 correspond to multiple parallel threads initiated to identify the memory regions 154 within the VADs 152 obtained by the VAD scanner 202. The processor 102 implements the memory region scanner(s) 204 by executing instructions 164. The memory region scanner(s) 204 enables the processor 102 to save the memory layout information. The processor 102 creates a plurality of dump tasks 206 which involve reading memory region data, compressing the memory region data, and writing the compressed information to the dump files(s). The processor 102 implements the various parallel processes by executing instructions 170 that spawn parallel threads that enable the processor 102 to execute instructions 1702, 1704, and 1706 as detailed herein thereby generating compressed dump files 110.

Figure 3:
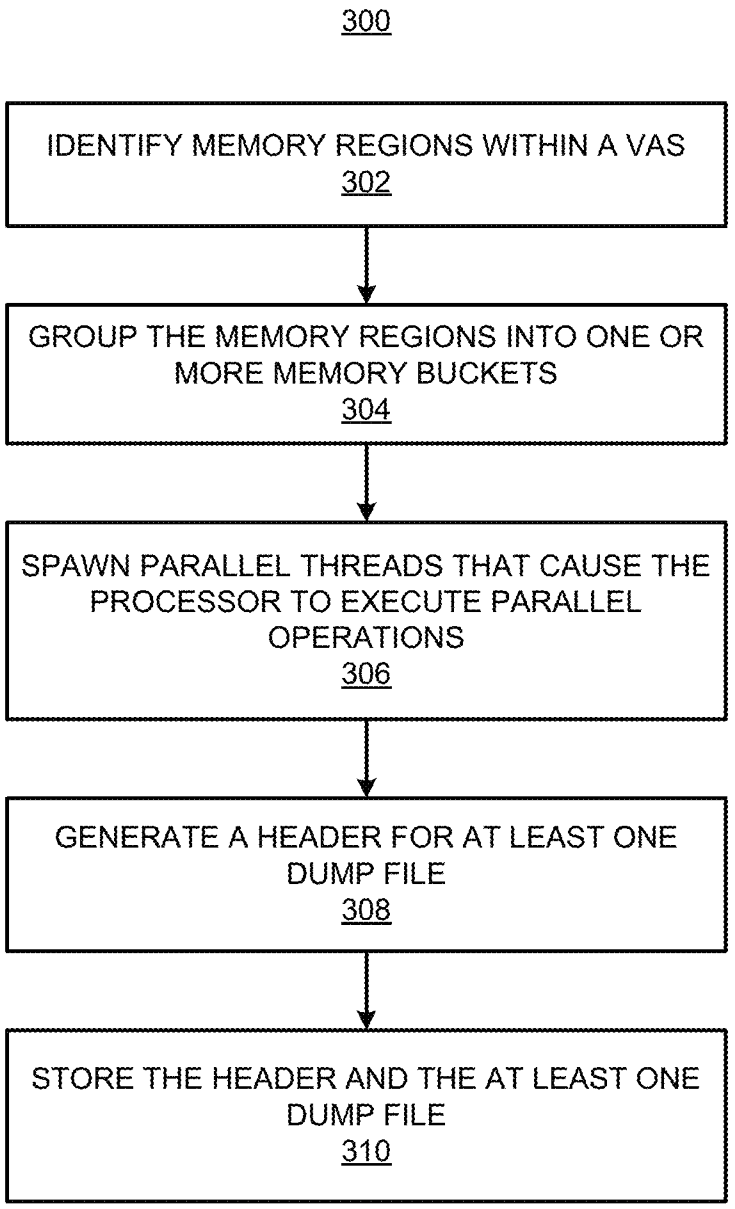
FIG. 3 shows a flow diagram of a method for generating compressed dump files of memory regions of a VAS, in accordance with an embodiment of the present disclosure.

FIG. 3 shows a flow diagram of a method 300 for generating compressed dump files 110 of memory regions 154 of a VAS 150, in accordance with an embodiment of the present disclosure. It should be understood that the operations disclosed with respect to the method 300 are for illustrative purposes and that the method 300 may include additional operations or that some of the operations may be modified or deleted without departing from a scope of the present disclosure. The description of the method 300 is made with reference to the features discussed with respect to FIGS. 1A-2 for purposes of illustration.

At block 302, the processor 102 identifies memory regions 154 within a VAS 150 by scanning the VAS 150, in which the memory regions 154 are to be saved to at least one compressed dump file 110. At block 304, the processor 102 groups the memory regions 154 into one or more fixed, equal-sized memory buckets 156. The processor 102 may group the memory regions 154 into the one or more memory buckets 156 based at least on sizes of the memory regions 154, in which respective memory regions 154 of the one or more memory buckets 156 satisfy size requirements of the one or more memory buckets 156.

At block 306, the processor 102 spawns parallel threads that cause the processor 102 to execute parallel operations. The parallel operations are to: compress the one or more memory buckets into one or more compressed memory chunks and write the one or more compressed memory chunks to be written to at least one compressed dump file. The processor 102 may continue the write operation of one of the compressed memory chunks in one of the parallel threads as the compress operation of another one of the compressed memory chunks is executed in another one of the parallel threads to execute the parallel operations. In addition, or alternatively, the processor 102 may enable the parallel threads to systematically select the one or more compressed memory chunks in an interleave order to execute the parallel operations.

At block 308, the processor 102 may generate a header for the at least one compressed dump file 110, in which the header includes a memory structure including metadata regarding at least the respective memory regions 154 and the one or more memory buckets 156. At block 310, the processor 102 may store the header and the at least one compressed dump file 110, for instance, in the data store 104.

Figure 4:
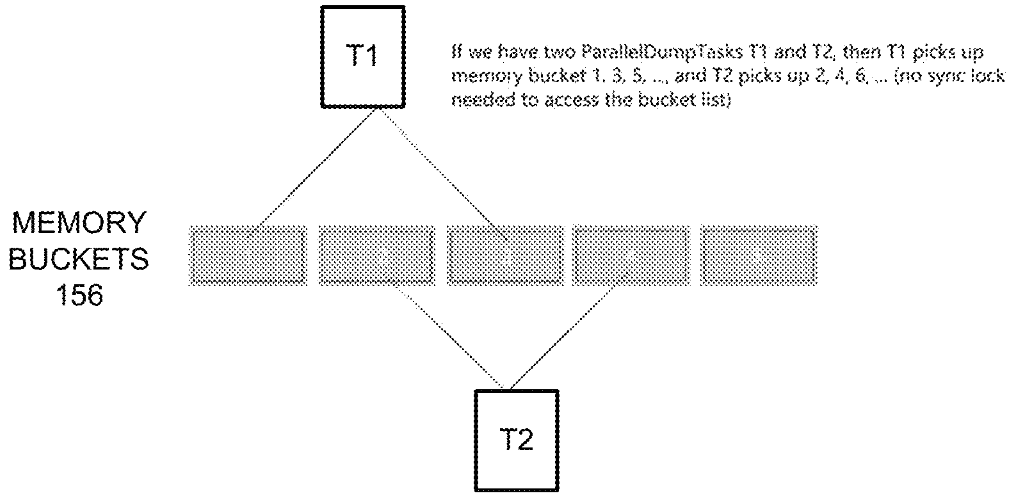
FIG. 4 shows a block diagram representing workload assignments to a plurality of parallel dump tasks, in accordance with an embodiment of the present disclosure.

FIG. 4 shows a block diagram 400 representing workload assignments to the plurality of parallel dump tasks 206, in accordance with an embodiment of the present disclosure. Distributing the workload evenly among the plurality of parallel dump tasks 206 helps prevent any individual task from causing a slowdown in the overall dumping process. The processor 102 accordingly executes instructions 1702 to initially read the memory regions 154 detected in the VAS 150 and hence obtain a comprehensive list of workloads that include the memory regions 154 to be processed. The compression and writing tasks are then evenly distributed among the plurality of parallel dump tasks 206 so that each parallel dump task picks up the memory buckets 156 evenly. The workload assignment to two parallel dump tasks T1 and T2 is illustrated in diagram 400.

According to an embodiment, T1 selects memory buckets 1, 3, 5, . . . and T2 selects memory buckets 2, 4, 6, . . . . The interleaving of memory buckets 156 by the plurality of parallel dump tasks 206, e.g., T1 and T2, mitigates the need to lock the list of memory regions 154 to allow dump tasks to select the memory buckets. By configuring the tasks T1 and T2 to select different buckets systematically by interleave order, the necessity for synchronization between the parallel dump tasks is mitigated. Furthermore, given that each memory bucket 156 has a comparable size, this approach ensures a balanced workload for each of the tasks T1 and T2.

Figure 5A:
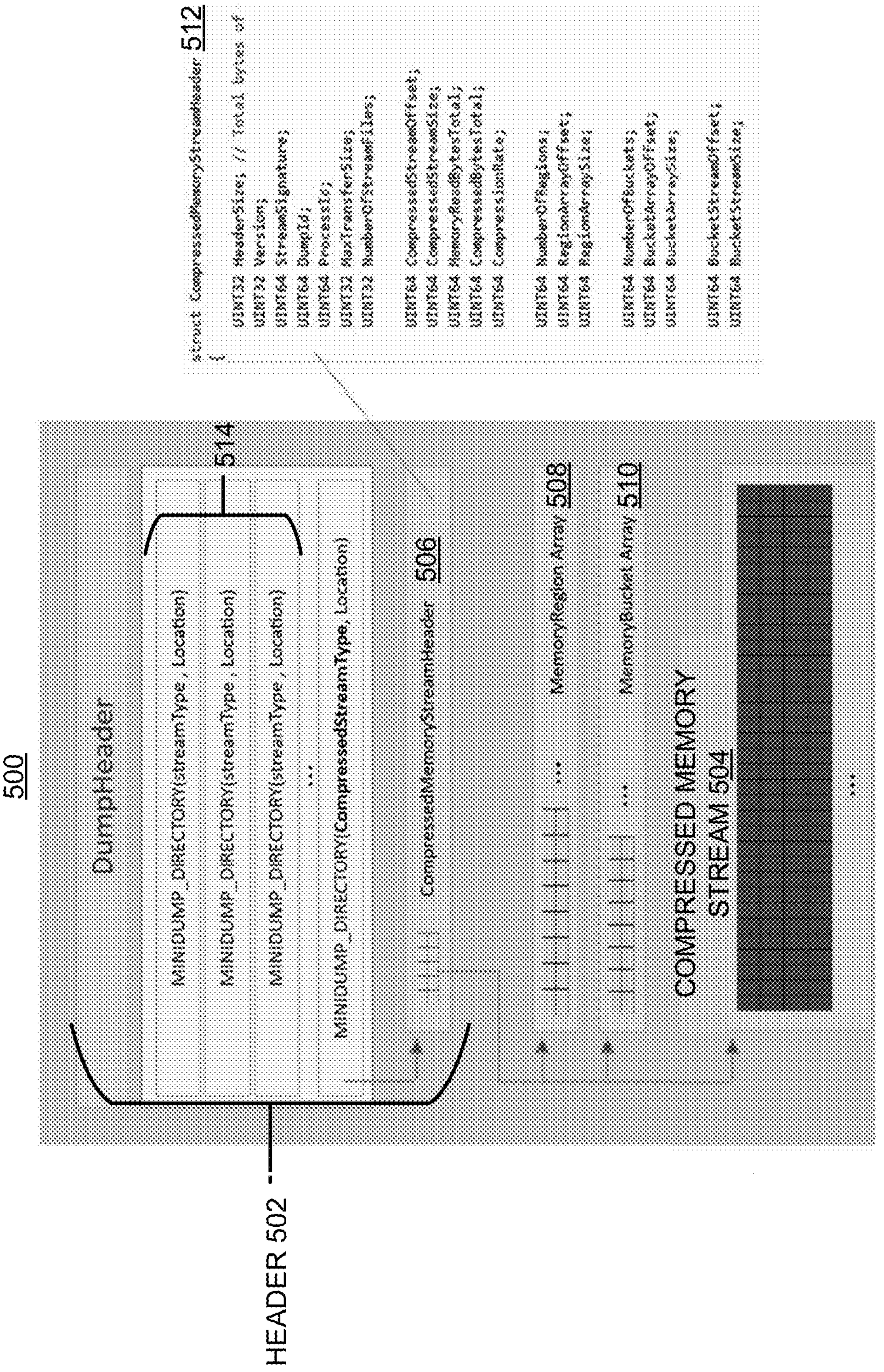
FIG. 5A shows a diagram of a dump file format, in accordance with an embodiment of the present disclosure.
Figure 5B:
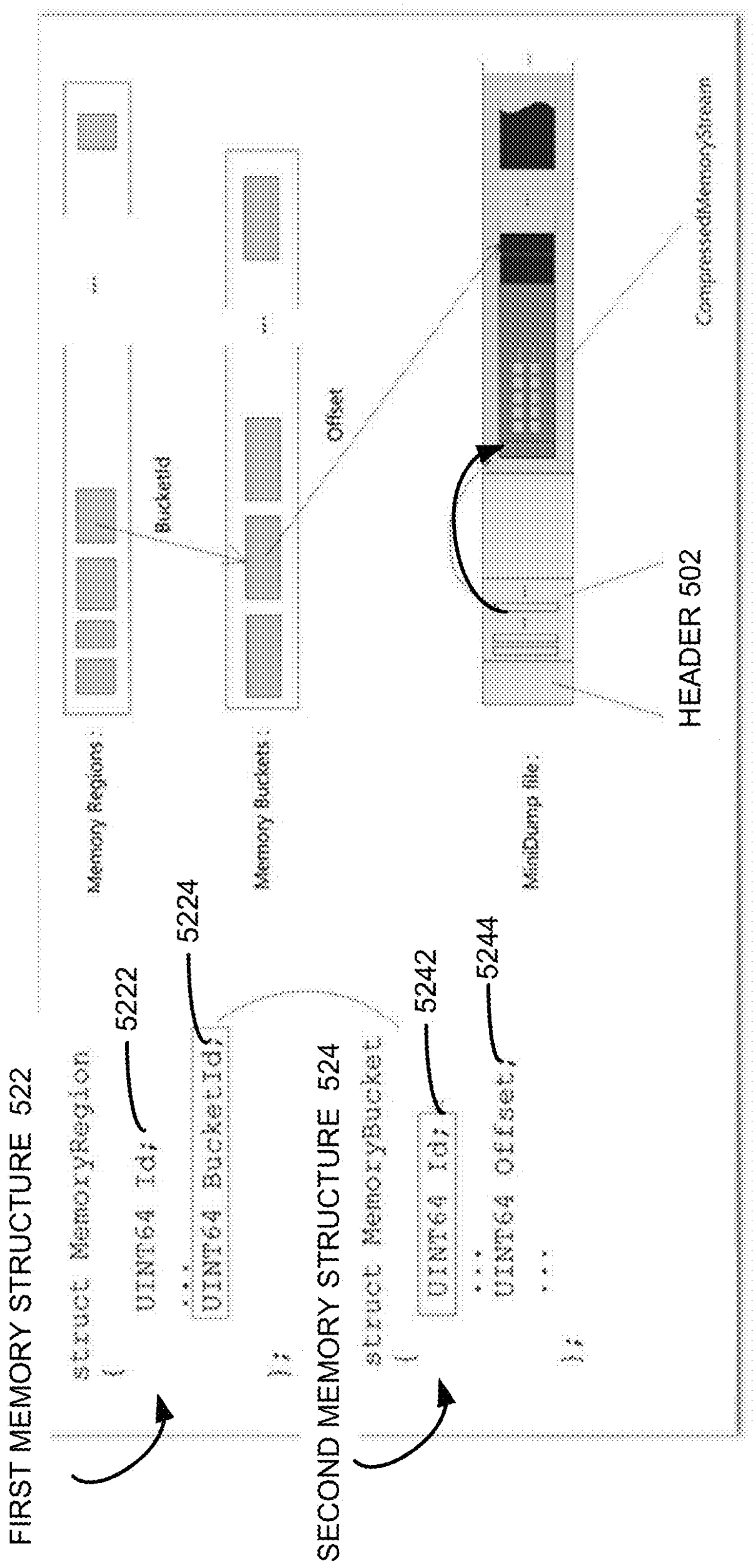
FIG. 5B shows a diagram of an offset in a dump file format, in accordance with an embodiment of the present disclosure.

FIG. 5A shows a diagram of a dump file format 500, in accordance with an embodiment of the present disclosure. FIG. 5B shows a diagram of an offset in a dump file format, in accordance with an embodiment of the present disclosure. The dump file format 500 includes a header 502 and a compressed memory stream 504. In addition to the minidump directories 514, the header 502 also includes a compressed memory stream header 506, which in turn includes a memory region array 508 and a memory bucket array 510. As shown in the memory structure 512, the compressed memory stream header 506 includes, for a given compressed memory chunk, e.g., Unit 64, various pieces of metadata such as but not limited to, compressed memory stream size, the compressed memory stream offset, the compression rate, and the region array offset.

As shown in FIG. 5B, the header 502 includes two memory structures-a first memory structure 522, and a second memory structure 524. The first memory structure 522 includes metadata regarding the memory regions 154, such as the memory region ID 5222, the ID of the memory bucket where the memory region is stored, the memory bucket IDs 5224, etc. The second memory structure 524 includes a memory bucket ID 5242 and the offset 5244 of the target memory chunk. In an example, the header 502 can be written to a dedicated dump file.

The two memory structures, e.g., the first memory structure 522 and the second memory structure 524 enable retrieval of the original memory. For example, the memory bucket ID 5224 is obtained from the first memory structure 522 which is then used in the second memory structure 524 to get the offset 5244, which enables location of the compressed chunk in the compressed dump file. Furthermore, the header 502 and the compressed memory stream 504 can be stored in the same file or in different dump files on the same disk or in different disks. The compressed memory stream 504 can be further divided into multiple portions, which can be saved to different disks. As the reading and writing tasks occur in parallel, the dumping speed is increased considerably by the compressed memory dump apparatus 100. The compressed dump file is then decompressed to obtain the original memory contents. In an embodiment, e.g., for Windows® OS, a compressed dump file can be converted to a regular memory dump file, using the "–zc" command. This conversion process results in an inflated file size and may require varying amounts of time for decompression, contingent upon the original file size.

The dump files 110 include a new dump stream, e.g., a compressed memory stream which is a customized stream that is not recognized by debuggers by default. The compressed memory target plugin in the compressed memory dump parser module 174 provides the service to parse the compressed memory stream and provide ReadMemory service to the debugger Application Programming Interfaces (API). Compressed memory dump parser module 174 intercepts the ReadMemory API call (e.g., to the Memory64ListStream), and uses a custom routine to return the requested memory from the compressed memory stream as shown in FIG. 6, which lays out the steps of retrieving data from the compressed dump files in accordance with an embodiment of the present disclosure.

Figure 6:
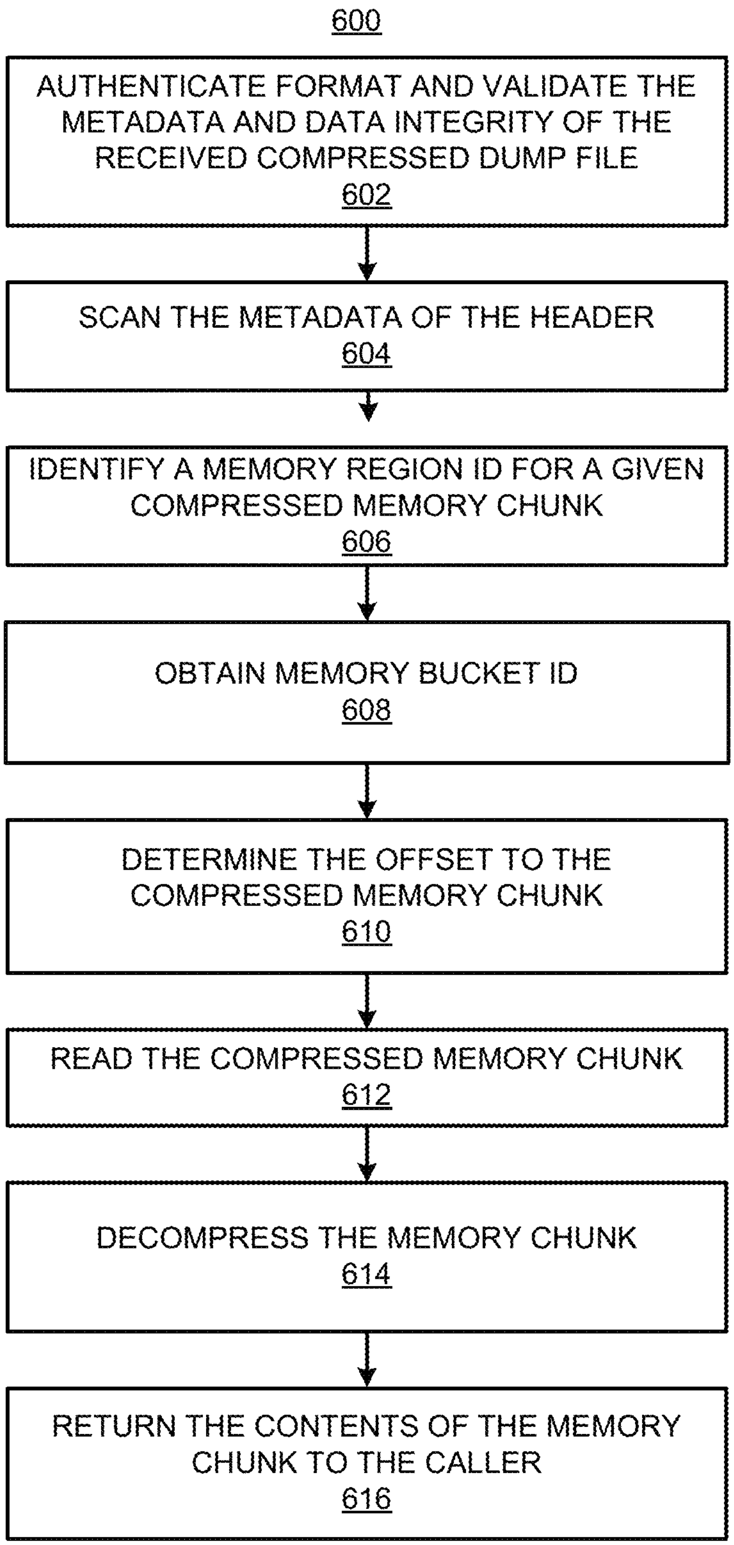
FIG. 6 is a flowchart of a method of retrieving data from a compressed dump file, in accordance with an embodiment of the present disclosure.

As shown in FIG. 6, when the processor 102 is to extract data from a received compressed dump file 112, the format of the received dump file is authenticated and parsed, and the metadata and data integrity of the received compressed dump file 112 is verified as indicated at block 602. At block 604, the compressed memory target plugin scans the metadata in the header of the received compressed dump file 112. In an example, the metadata can include the various stream locations and sizes in addition to the offsets. From the metadata in the header, at block 606, the memory region ID for a given memory chunk is identified. At block 608, the memory region ID is further used to obtain the memory bucket ID. From the memory bucket ID, at block 610, the offset to the compressed memory chunk is determined. The compressed memory chunk is identified based on the offset. At block 612, the compressed memory chunk is read and at block 614, the compressed memory chunk is decompressed. At block 616, the contents of the memory chunk on decompression are returned to the caller.

In some examples, some or all of the operations set forth in the methods 300 and 600 are included as utilities, programs, or subprograms, in any desired computer accessible medium. In some examples, the methods 300 and 600 are embodied by computer programs, which may exist in a variety of forms both active and inactive. For example, the computer programs exist as machine-readable instructions, including source code, object code, executable code or other formats. Any of the above, in some examples, are embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:

a memory; and a processor operatively coupled with the memory, the processor to:

group memory regions in a virtual address space of a target process into one or more memory buckets, wherein the one or more memory buckets comprise respective memory regions;

spawn parallel threads that execute parallel operations, wherein the parallel threads:

compress the one or more memory buckets into one or more compressed memory chunks; and write the one or more compressed memory chunks to at least one dump file; and generate a header for the at least one dump file, wherein the header includes metadata regarding at least the respective memory regions and the one or more memory buckets.

2. The apparatus of claim 1, wherein the processor is further to:

identify the respective memory regions by scanning the virtual address space in parallel; and save memory layout information to the header of the at least one dump file.

3. The apparatus of claim 1, wherein the one or more memory buckets are of fixed, equal size to each other.

4. The apparatus of claim 3, wherein to group the memory regions into the one or more memory buckets, the processor is to:

divide the memory regions into the one or more memory buckets, wherein the respective memory regions in the one or more memory buckets fit the equal, fixed size of the one or more memory buckets.

5. The apparatus of claim 1, wherein the parallel operations of the parallel threads further cause the processor to:

read the one or more memory buckets in parallel to and concurrently with writing the one or more compressed memory chunks to the at least one dump file.

6. The apparatus of claim 5, wherein to write the one or more compressed memory chunks to the at least one dump file, the processor is to:

access a list of the one or more memory buckets from a memory layout scan of the virtual address space; and cause the parallel threads to select the one or more memory buckets by interleave order.

7. The apparatus of claim 6, wherein to write the one or more compressed memory chunks to the at least one dump file, the processor is to:

execute, via the parallel threads, for the one or more memory buckets selected by the parallel threads, the compression of the one or more memory buckets and the writing of the one or more compressed memory chunks to the at least one dump file.

8. The apparatus of claim 1, wherein to write the one or more compressed memory chunks to at least one dump file, the processor is to:

write the one or more compressed memory chunks to a plurality of dump files, wherein the at least one dump file includes the plurality of dump files.

9. The apparatus of claim 8, wherein to write the one or more compressed memory chunks to at least one dump file, the processor is to:

write the header to a dedicated dump file of the plurality of dump files.

10. The apparatus of claim 1, wherein to write the header to a dedicated dump file, the processor is to:

configure a first memory structure with metadata related to the respective memory regions; and configure a second memory structure with metadata related to the one or more memory buckets.

11. The apparatus of claim 10, wherein to configure the second memory structure, the processor is to:

include within the second memory structure, an offset for a compressed chunk of the one or more compressed memory chunks.

12. The apparatus of claim 1, wherein the the processor is further to:

authenticate a format of one or more received dump files of a virtual address space of a target process; and verify metadata and data integrity of the one or more received dump files.

13. The apparatus of claim 12, wherein the processor is further to:

retrieve contents of a requested memory region from the one or more received dump files via the metadata in a header of the one or more received dump files, wherein the header is in a dedicated dump file of the one or more received dump files.

14. A method comprising:

identifying, by a processor, memory regions within a Virtual Address Space (VAS) by scanning the VAS, wherein the memory regions are to be saved to at least one compressed dump file;

grouping, by the processor, the memory regions into one or more fixed, equal-sized memory buckets;

spawning, by the processor, parallel threads that cause the processor to execute parallel operations comprising:

compressing the one or more memory buckets into one or more compressed memory chunks; and writing the one or more compressed memory chunks to be written to at least one dump file; and generating, by the processor, a header for the at least one compressed dump file, wherein the header includes a memory structure including metadata regarding at least the respective memory regions and the one or more memory buckets.

15. The method of claim 14, further comprising:

grouping the memory regions into the one or more memory buckets based at least on sizes of the memory regions, wherein respective memory regions of the one or more memory buckets satisfy size requirements of the one or more memory buckets.

16. The method of claim 14, further comprising:

continuing writing of one of the compressed memory chunks in one of the parallel threads as the compress operation of another one of the compressed memory chunks is executed in another one of the parallel threads to execute the parallel operations.

17. The method of claim 16, further comprising:

enabling the parallel threads to systematically select the one or more compressed memory chunks in an interleave order to execute the parallel operations.

18. A non-transitory computer-readable medium on which is stored a plurality of instructions that, when executed by a processor, cause the processor to:

scan a header associated with a compressed dump file, wherein the header includes at least a memory region array and a memory bucket array;

identify, from the memory region array, a memory region ID corresponding to a given compressed memory chunk;

obtain, from the memory bucket array, a memory bucket ID of a memory bucket including a memory region corresponding to the memory region ID, wherein the memory bucket includes a plurality of memory regions;

determine an offset of the compressed memory chunk from the memory bucket;

decompress the compressed memory chunk retrieved at the offset; and provide to a caller, memory contents obtained upon decompressing the compressed memory chunk.

19. The computer-readable medium of claim 18, wherein to scan the header the processor is further to:

access the dump file that includes the header.

20. The computer-readable medium of claim 18, wherein the compressed dump file further includes a compressed memory stream of a virtual address space of a target process.

* * * * *